V. HARVEY AND C. D. HARDING.
PUNCTURE PROOF TUBE PROTECTOR FOR AUTOMOBILE TIRES.
APPLICATION FILED MAY 18, 1921.

1,396,200. Patented Nov. 8, 1921.

Inventors
Vivian Harvey &
Charles D. Harding

By Lester L. Sargent
Attorney

Witness

UNITED STATES PATENT OFFICE.

VIVIAN HARVEY AND CHARLES D. HARDING, OF PLATTEVILLE, MISSOURI.

PUNCTURE-PROOF-TUBE PROTECTOR FOR AUTOMOBILE-TIRES.

1,396,200.

Specification of Letters Patent.   Patented Nov. 8, 1921.

Application filed May 12, 1921. Serial No. 470,882.

*To all whom it may concern:*

Be it known that we, VIVIAN HARVEY and CHARLES D. HARDING, citizens of the United States, residing at Platteville, in the county of Grant and State of Missouri, have invented a new and useful Puncture-Proof-Tube Protector for Automobile-Tires, of which the following is a specification.

The object of our invention is to provide an efficient puncture proof tube protector having a novel fastening means that will not injure the inner tube and which will permit of a degree of expansion and contraction necessary when the device is in use on rough roads.

We attain the objects of our invention by the mechanism illustrated in the accompanying drawings in which—

Like numerals designate like parts in each of the several views.

Figure 3:
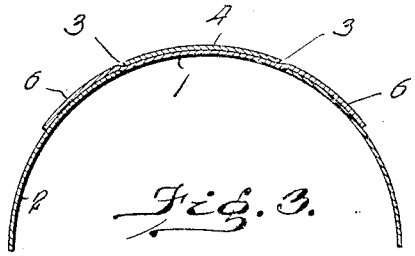
Fig. 3 is a transverse section through the joint on line 3—3 of Fig. 2.
Figure 1:
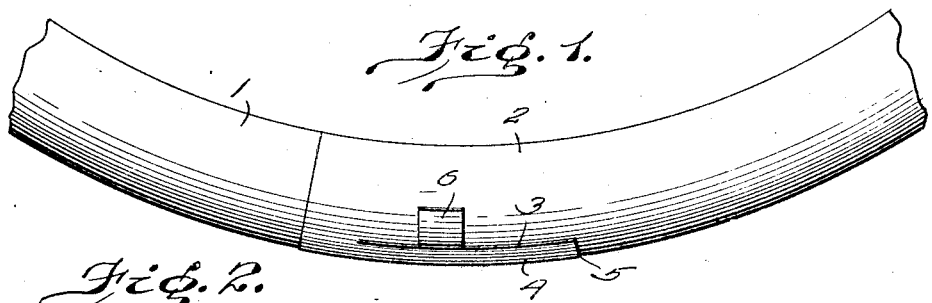
Figure 1 is a side elevation of a portion of the invention including the joint.

Referring to the accompanying drawings I provide a suitable metal annular tube protector semi-circular in cross section shaped to engage over the inner tube of a tire and having a slidable joint connecting the ends 1 and 2 of the protector. The end 2 is provided with longitudinal slots 3 and a transverse connecting slot 5 forming a longitudinal tongue 4. The end 1 is provided with a T-shaped tongue 6 and opposite slots 7 of substantially the same width as the slot 5 in member 2.

Figure 2:
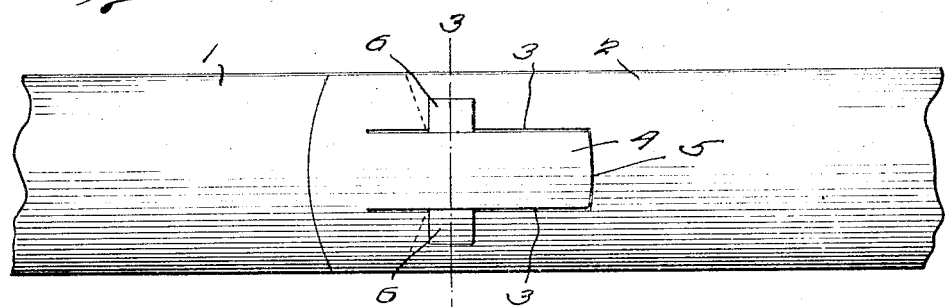
Fig. 2 is a bottom plan of same.
Figure 4:
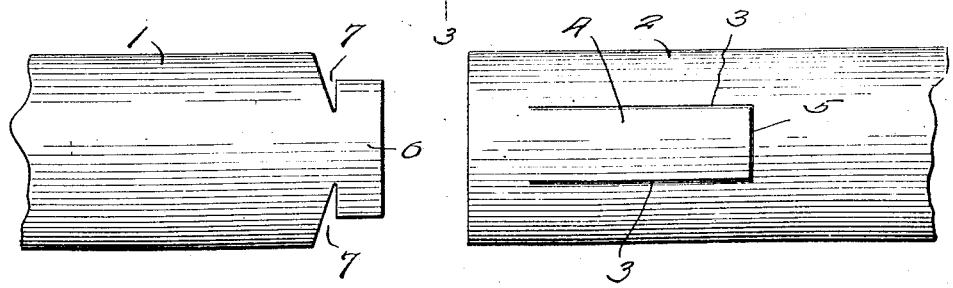
Fig. 4 is a bottom plan of the device disconnected at the joint.

In operation the free ends of tongue 6 are inserted through the slots 3 on either side of the tongue 4 as illustrated in Figs. 2 and 3. A smooth but expansible and connectible joint is thus formed.

We are aware that tire protectors have heretofore been devised utilizing rivets but such devices make so large a joint that they prove very cumbersome, cause too great wear and tear on the tube, and do not admit of the necessary expansion and contraction which makes our device a practical one and which by reason of the smooth joint attained and the freedom to expand and contract without injuring the rubber tire constitutes a substantial improvement in the art.

What we claim is—

An annular metal tire tube protector, semi-circular in cross section and adapted to fit smoothly over the inner tube of the tire, the protector having a joint formed on interlocking ends, said joint consisting of a longitudinal tongue formed of an approximately U-shaped slot in one end of the tube protector and a short T-shaped tongue having the free ends of said tongue inserted through the slots of the other end of the tube, whereby to form an entirely smooth flexible joint free from projections to injure the inner tube and arranged substantially as shown.

VIVIAN HARVEY.
CHARLES D. HARDING.